United States Patent
Yokomakura et al.

(10) Patent No.: US 10,939,399 B2
(45) Date of Patent: Mar. 2, 2021

(54) BASE STATION APPARATUS, TERMINAL APPARATUS, COMMUNICATION METHOD, AND INTEGRATED CIRCUIT WITH SYNCHRONIZATION SIGNAL BLOCK INCLUDING FIRST SYNCHRONIZATION SIGNAL, SECOND SYNCHRONIZATION SIGNAL, AND PHYSICAL BROADCAST CHANNEL

(71) Applicants: Sharp Kabushiki Kaisha, Sakai (JP); FG Innovation Company Limited, Tuen Mun (HK)

(72) Inventors: Kazunari Yokomakura, Sakai (JP); Shohei Yamada, Sakai (JP); Hidekazu Tsuboi, Sakai (JP); Hiroki Takahashi, Sakai (JP)

(73) Assignees: SHARP KABUSHIKI KAISHA, Sakai (JP); FG INNOVATION COMPANY LIMITED, New Territories (HK)

(*) Notice: Subject to any disclaimer, the term of this patent is extended or adjusted under 35 U.S.C. 154(b) by 0 days.

(21) Appl. No.: 16/473,296

(22) PCT Filed: Dec. 5, 2017

(86) PCT No.: PCT/JP2017/043638
§ 371 (c)(1),
(2) Date: Jun. 25, 2019

(87) PCT Pub. No.: WO2018/123468
PCT Pub. Date: Jul. 5, 2018

(65) Prior Publication Data
US 2019/0373570 A1    Dec. 5, 2019

(30) Foreign Application Priority Data

Dec. 28, 2016 (JP) .............. JP2016-255320

(51) Int. Cl.
*H04W 56/00* (2009.01)
*H04L 7/08* (2006.01)

(52) U.S. Cl.
CPC ............. *H04W 56/002* (2013.01); *H04L 7/08* (2013.01)

(58) Field of Classification Search
None
See application file for complete search history.

(56) References Cited

U.S. PATENT DOCUMENTS

2018/0184391 A1*  6/2018  Ly ..................... H04L 27/2657
2020/0015239 A1*  1/2020  Guey ................. H04L 27/2692

OTHER PUBLICATIONS

NTT Docomo Inc., "RAN WG's progress on NR technology SI in the October meeting", 3GPP TSG-RAN WG2 #96, R2-168015, Nov. 14-18, 2016, pp. 1-30.

(Continued)

*Primary Examiner* — Christine T Duong
(74) *Attorney, Agent, or Firm* — Keating & Bennett, LLP

(57) ABSTRACT

A terminal apparatus for communicating with a base station apparatus includes a receiver configured to receive at least one synchronization signal burst periodically transmitted. A first synchronization signal and a second synchronization signal are mapped at a particular time position in a radio frame. Each of the at least one synchronization signal burst includes at least one synchronization signal block. Each of the at least one synchronization signal block includes at least one of the first synchronization signal, the second synchronization signal, or a physical broadcast channel. The receiver receives, from the base station apparatus, information for indicating the number of the at least one synchronization signal block included in each of the at least one synchronization signal burst.

6 Claims, 9 Drawing Sheets

(56) References Cited

OTHER PUBLICATIONS

Motorola Mobility, "Introduction of D2D (ProSe), Dual Connectivity, Small Cell Enhancements, NAICS, eIMTA, and TDD-FDD CA features", 3GPP TSG-RAN WG1 Meeting #78bis, R1-144537, Oct. 6-10, 2014, 233 pages.

Media Tek Inc., "Link Level Simulation Results for NR Initial Synchronization above 6 GHz with Updted Evaluation Assumptions", 3GPP TSG RAN WG1 Meeting #87, R1-1612127, Nov. 14-18, 2016, 5 pages.

Nokia et al., "Synchronization Signal Structure", 3GPP TSG-RAN WG1#87, R1-1612803, Nov. 14-18, 2016, 5 pages.

Xinwei, "Further Discussion on Beam Management in Random Access Procedures", 3GPP TSG-RAN WG1 #87, R1-1612255, Nov. 14-18, 2016, pp. 1-6.

Nokia et al. "On NR synchronization signal periodicity", 3GPP TSG-RAN WG1#87, R1-1612804, Nov. 14-18, 2016, 5 pages.

Coolpad, "Discussion on the design for synchronization signal", 3GPP TSG RAN WG1 Meeting #87, R1-1612755, Nov. 14-18, 2016, 3 pages.

Huawei et al. "Unified single/multiple beam operations for initial access", 3GPP TSG RAN WG1 Meeting #87, R1-1611667, Nov. 14-18, 2016, pp. 1-10.

Official Communication issued in International Patent Application No. PCT/JP2017/043638, dated Feb. 27, 2018.

NTT DOCOMO, "Revision of SI: Study on New Radio Access Technology", 3GPP TSG RAN Meeting #72, RP-161214, Jun. 13-16, 2016, 8 pages.

NTT DOCOMO, Inc., "Discussion on initial access procedure for NR", 3GPP TSG RAN WG1 Meeting #87, R1-1612723, Nov. 14-18, 2016, 5 pages.

Nokia et al., "On Synchronization Signals for Single-beam and Multi-beam Configurations", 3GPP TSG-RAN WG1#87, R1-1612801, Nov. 14-18, 2016, 4 pages.

Intel Corporation, "On NR initial access and mobility", 3GPP TSG-RAN WG1 Meeting #87, R1-1611969, Nov. 14-18, 2016, 7 pages.

Zte et al., "Considerations on SS burst design", 3GPP TSG RAN WG1 Meeting #87, R1-1611269, Nov. 14-18, 2016, 5 pages.

InterDigital Communications, "A Framework for Initial Access for NR", 3GPP TSG-RAN WG1 #87, R1-1612309, Nov. 14-18, 2016, 5 pages.

NTT DOCOMO, Inc., "Discussion on initial access design for NR", 3GPP TSG RAN WG1 Meeting #86bis, R1-1610073, Oct. 10-14, 2016, 7 pages.

\* cited by examiner

BASE STATION APPARATUS, TERMINAL APPARATUS, COMMUNICATION METHOD, AND INTEGRATED CIRCUIT WITH SYNCHRONIZATION SIGNAL BLOCK INCLUDING FIRST SYNCHRONIZATION SIGNAL, SECOND SYNCHRONIZATION SIGNAL, AND PHYSICAL BROADCAST CHANNEL

TECHNICAL FIELD

The present invention relates to a base station apparatus, a terminal apparatus, a communication method, and an integrated circuit.

This application claims priority based on JP 2016-255320 filed on Dec. 28, 2016, the contents of which are incorporated herein by reference.

BACKGROUND ART

Technical studies and standardization of Long Term Evolution (LTE)-Advanced Pro and New Radio (NR) technology, as a radio access scheme and a radio network technology for fifth generation cellular systems, are currently conducted by the Third Generation Partnership Project (3GPP) (NPL 1).

The fifth generation cellular system requires three anticipated scenarios for services: enhanced Mobile BroadBand (eMBB) which realizes high-speed, high-capacity transmission, Ultra-Reliable and Low Latency Communication (URLLC) which realizes low-latency, high-reliability communication, and massive Machine Type Communication (mMTC) that allows a large number of machine type devices to be connected in a system such as Internet of Things (IoT).

In NR, configurations and procedures for initial access at high frequencies have been studied (NPL 2, NPL 3, and NPL 4).

CITATION LIST

Non Patent Literature

NPL 1: RP-161214, NTT DOCOMO, "Revision of SI: Study on New Radio Access Technology", June 2016

NPL 2: R1-1612723, NTT DOCOMO, "Discussion on initial access procedure for NR", November 2016

NPL 3: R1-1612801, Nokia, Alcatel-Lucent Shanghai Bell, "On Synchronization Signals for Single-beam and Multi-beam Configurations", November 2016

NPL 4: R1-1611969, Intel Corporation, "On NR initial access and mobility", November 2016

SUMMARY OF INVENTION

Technical Problem

An object of the present invention is to provide a terminal apparatus, a base station apparatus, a communication method, and an integrated circuit, where the base station apparatus and the terminal apparatus can efficiently communicate in the above-mentioned radio communication systems.

Solution to Problem (1) To accomplish the object described above, aspects of the present invention are contrived to provide the following measures. In other words, according to an aspect of the present invention, a terminal apparatus for communicating with a base station apparatus is provided, the terminal apparatus including a receiver configured to receive at least one synchronization signal burst periodically transmitted, wherein a first synchronization signal and a second synchronization signal are mapped at a particular time position in a radio frame, and each of the at least one synchronization signal burst includes at least one synchronization signal block, each of the at least one synchronization signal block includes at least one of the first synchronization signal, the second synchronization signal, or a physical broadcast channel, and the receiver receives, from the base station apparatus, information for indicating the number of the at least one synchronization signal block included in each of the at least one synchronization signal burst.

(2) Furthermore, in the terminal apparatus according to an aspect of the present invention, the number of the at least one synchronization signal block is indicated by an index for generating a sequence of at least one of the first synchronization signal or the second synchronization signal.

(3) Furthermore, in the terminal apparatus according to an aspect of the present invention, the number of the at least one synchronization signal block is indicated by a master information block transmitted in the physical broadcast channel.

(4) According to an aspect of the present invention, a base station apparatus for communicating with a terminal apparatus is provided, the base station apparatus including a transmitter configured to transmit at least one synchronization signal burst periodically transmitted, wherein a first synchronization signal and a second synchronization signal are mapped at a particular time position in a radio frame, and each of the at least one synchronization signal burst includes at least one synchronization signal block, each of the at least one synchronization signal block includes at least one of the first synchronization signal, the second synchronization signal, or a physical broadcast channel, and the transmitter transmits, from the base station apparatus, information for indicating the number of the at least one synchronization signal block included in each of the at least one synchronization signal burst.

(5) Furthermore, in the base station apparatus according to an aspect of the present invention, the number of the at least one synchronization signal block is indicated by an index for generating a sequence of at least one of the first synchronization signal or the second synchronization signal.

(6) Furthermore, in the base station apparatus according to an aspect of the present invention, the number of the at least one synchronization signal block is indicated by a master information block transmitted in the physical broadcast channel.

(7) According to an aspect of the present invention, a communication method for a terminal apparatus for communicating with a base station apparatus is provided, the communication method including the step of receiving at least one synchronization signal burst periodically transmitted, wherein a first synchronization signal and a second synchronization signal are mapped at a particular time position in a radio frame, each of the at least one synchronization signal burst includes at least one synchronization signal block, each of the at least one synchronization signal block includes at least one of the first synchronization signal, the second synchronization signal, or a physical broadcast channel, and information for indicating the number of the at least one synchronization signal block included in each of the at least one synchronization signal burst is received from the base station apparatus.

(8) According to an aspect of the present invention, a communication method for a base station apparatus for communicating with a terminal apparatus is provided, the communication method including the step of transmitting at least one synchronization signal burst periodically transmitted, wherein a first synchronization signal and a second synchronization signal are mapped at a particular time position in a radio frame, each of the at least one synchronization signal burst includes at least one synchronization signal block, each of the at least one synchronization signal block includes at least one of the first synchronization signal, the second synchronization signal, or a physical broadcast channel, and information for indicating the number of the at least one synchronization signal block included in each of the at least one synchronization signal burst is transmitted from the base station apparatus.

(9) According to an aspect of the present invention, an integrated circuit implemented in a terminal apparatus for communicating with a base station apparatus is provided, the integrated circuit including a receiver configured to receive at least one synchronization signal burst periodically transmitted, wherein a first synchronization signal and a second synchronization signal are mapped at a particular time position in a radio frame, each of the at least one synchronization signal burst includes at least one synchronization signal block, each of the at least one synchronization signal block includes at least one of the first synchronization signal, the second synchronization signal, or a physical broadcast channel, and the receiver receives, from the base station apparatus, information for indicating the number of the at least one synchronization signal block included in each of the at least one synchronization signal burst.

(10) According to an aspect of the present invention, an integrated circuit implemented in a base station apparatus for communicating with a terminal apparatus is provided, the integrated circuit including a transmitter configured to transmit at least one synchronization signal burst periodically transmitted, wherein a first synchronization signal and a second synchronization signal are mapped at a particular time position in a radio frame, each of the at least one synchronization signal burst includes at least one synchronization signal block, each of the at least one synchronization signal block includes at least one of the first synchronization signal, the second synchronization signal, or a physical broadcast channel, and the transmitter transmits, from the base station apparatus, information for indicating the number of the at least one synchronization signal block included in each of the at least one synchronization signal burst.

Advantageous Effects of Invention

According to an aspect of the present invention, a base station apparatus and a terminal apparatus can efficiently communicate with each other.

DESCRIPTION OF EMBODIMENTS

Embodiments of the present invention will be described below.

Figure 1:
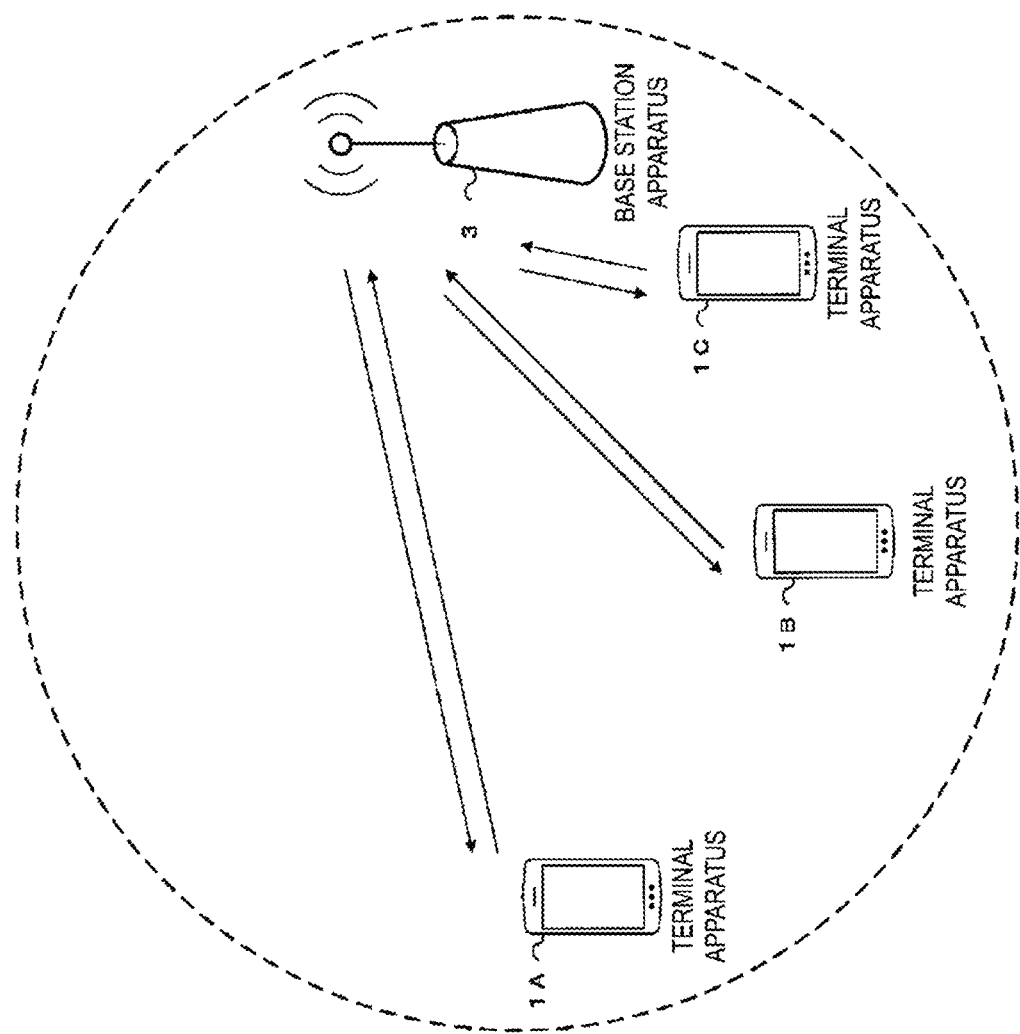
FIG. 1 is a diagram illustrating a concept of a radio communication system according to the present embodiment.

FIG. 1 is a conceptual diagram of a radio communication system according to the present embodiment. In FIG. 1, a radio communication system includes terminal apparatuses 1A to 1C and a base station apparatus 3. Hereinafter, the terminal apparatuses 1A to 1C are each also referred to as a terminal apparatus 1.

The terminal apparatus 1 is also called a user terminal, a mobile station device, a communication terminal, a mobile device, a terminal, User Equipment (UE), and a Mobile Station (MS). The base station apparatus 3 is also referred to as a radio base station apparatus, a base station, a radio base station, a fixed station, a NodeB (NB), an evolved NodeB (eNB), a Base Transceiver Station (BTS), a Base Station (BS), an NR NodeB (NR NB), NNB, a Transmission and Reception Point (TRP), or gNB.

In FIG. 1, in a radio communication between the terminal apparatus 1 and the base station apparatus 3, Orthogonal Frequency Division Multiplexing (OFDM) including a Cyclic Prefix (CP), Single-Carrier Frequency Division Multiplexing (SC-FDM), Discrete Fourier Transform Spread OFDM (DFT-S-OFDM), or Multi-Carrier Code Division Multiplexing (MC-CDM) may be used.

Furthermore, in FIG. 1, in the radio communication between the terminal apparatus 1 and the base station apparatus 3, Universal-Filtered Multi-Carrier (UFMC), Filtered OFDM (F-OFDM), Windowed OFDM, or Filter-Bank Multi-Carrier (FBMC) may be used.

Note that the present embodiment will be described by using OFDM symbol with the assumption that a transmission scheme is OFDM, and use of any other transmission scheme is also included in an aspect of the present invention.

Furthermore, in FIG. 1, in the radio communication between the terminal apparatus 1 and the base station apparatus 3, the CP may not be used, or the above-described transmission scheme with zero padding may be used instead of the CP. Moreover, the CP or zero passing may be added both forward and backward.

In FIG. 1, in a radio communication between the terminal apparatus 1 and the base station apparatus 3, Orthogonal Frequency Division Multiplexing (OFDM) including a Cyclic Prefix (CP), Single-Carrier Frequency Division Multiplexing (SC-FDM), Discrete Fourier Transform Spread OFDM (DFT-S-OFDM), or Multi-Carrier Code Division Multiplexing (MC-CDM) may be used.

In FIG. 1, the following physical channels are used for the radio communication between the terminal apparatus 1 and the base station apparatus 3.

Physical Broadcast CHannel (PBCH)
Physical Control CHannel (PCCH)
Physical Shared CHannel (PSCH)

The PBCH is used to broadcast essential information block ((Master Information Block (MIB), Essential Information Block (EIB), and Broadcast Channel (BCH)) which includes essential information needed by the terminal apparatus 1.

The PCCH is used to transmit Uplink Control Information (UCI) in a case of uplink radio communication (radio communication from the terminal apparatus 1 to the base station apparatus 3). Here, the uplink control information may include Channel State Information (CSI) used to indicate a downlink channel state. The uplink control information may include Scheduling Request (SR) used to request an UL-SCH resource. The uplink control information may include Hybrid Automatic Repeat reQuest ACKnowledgment (HARQ-ACK). The HARQ-ACK may indicate a HARQ-ACK for downlink data (Transport block, Medium Access Control Protocol Data Unit (MAC PDU), or Downlink-Shared CHannel (DL-SCH)).

Furthermore, the PCCH is used to transmit downlink control information (DCI) in a case of downlink radio communication (radio communication from the base station apparatus 3 to the terminal apparatus 1). Here, one or more pieces of DCI (which may be referred to as DCI formats) are defined for transmission of the downlink control information. In other words, a field for the downlink control information is defined as DCI and is mapped to information bits.

For example, the DCI may be defined to include information for indicating whether a signal included in a scheduled PSCH corresponds to downlink radio communication or uplink radio communication.

For example, the DCI may be defined to include information for indicating a downlink transmission period included in a scheduled PSCH.

For example, the DCI may be defined to include information for indicating an uplink transmission period included in a scheduled PSCH.

For example, the DCI may be defined to include information for indicating a timing for transmitting HARQ-ACK with respect to a scheduled PSCH (for example, the number of symbols from the last symbol included in the PSCH to the symbol for transmission of the HARQ-ACK).

For example, the DCI may be defined to include information for indicating a downlink transmission period, a gap, and an uplink transmission period included in a scheduled PSCH.

For example, the DCI may be defined to be used for the scheduling of a downlink radio communication PSCH in a cell (transmission of a downlink transport block).

For example, the DCI may be defined to be used for the scheduling of an uplink radio communication PSCH in a cell (transmission of an uplink transport block).

Here, the DCI includes information about the scheduling of the PSCH in a case that the PSCH includes the uplink or the downlink. Here, the DCI for the downlink is also referred to as downlink grant or downlink assignment. Here, the DCI for the uplink is also referred to as uplink grant or uplink assignment.

The PSCH is used to transmit uplink data (Uplink Shared CHannel (UL-SCH)) or downlink data (Downlink Shared CHannel (DL-SCH)) from Medium Access Control (MAC). Furthermore, in a case of the downlink, the PSCH is used to transmit System Information (SI), a Random Access Response (PAR), and the like. In a case of the uplink, the PSCH may be used to transmit the HARQ-ACK and/or CSI along with the uplink data. Furthermore, the PSCH may be used to transmit the CSI only or the HARQ-ACK and CSI only. In other words, the PSCH may be used to transmit the UCI only.

Here, the base station apparatus 3 and the terminal apparatus 1 exchange (transmit and/or receive) signals with each other in higher layers. For example, the base station apparatus 3 and the terminal apparatus 1 may transmit and/or receive Radio Resource Control (RRC) signaling (also referred to as a Radio Resource Control (RRC) message or Radio Resource Control (RRC) information) in an RRC layer. The base station apparatus 3 and the terminal apparatus 1 may transmit and receive a Medium Access Control (MAC) control element in a MAC layer. Here, the RRC signaling and/or the MAC control element is also referred to as higher layer signaling.

The PSCH may also be used to transmit the RRC signaling and the MAC control element. Here, the RRC signaling transmitted from the base station apparatus 3 may be signaling common to multiple terminal apparatuses 1 in a cell. The RRC signaling transmitted from the base station apparatus 3 may be signaling dedicated to a certain terminal apparatus 1 (also referred to as dedicated signaling). In other words, terminal apparatus-specific (UE-specific) information may be transmitted through signaling dedicated to the certain terminal apparatus 1. The PSCH may be used to transmit UE capabilities in the uplink.

Although the same designations of PCCH and PSCH are commonly used for the downlink and the uplink, different channels may be defined for the downlink and for the uplink.

For example, a downlink shared channel may be referred to as a Physical Downlink Shared CHannel (PDSCH). Furthermore, an uplink shared channel may be referred to as a Physical Uplink Shared CHannel (PUSCH). Furthermore, a downlink control channel may be referred to as a Physical Downlink Control Channel (PDCCH). An uplink control channel may be referred to as a Physical Uplink Control CHannel (PUCCH).

In FIG. 1, the following downlink physical signals are used for downlink radio communication. Here, the downlink physical signals are not used to transmit the information output from the higher layers but are used by the physical layer.

Synchronization Signal (SS)
Reference Signal (RS)

The synchronization signal may include a Primary Synchronization Signal (PSS) and a Secondary Synchronization Signal (SSS). A cell ID may be detected by using the PSS and SSS.

The synchronization signal is used for the terminal apparatus 1 to take synchronization in the frequency domain and the time domain in the downlink. Here, the synchronization signal may be used for the terminal apparatus 1 to select precoding or a beam in precoding or beamforming performed by the base station apparatus 3.

A reference signal is used for the terminal apparatus 1 to perform channel compensation on a physical channel. Here, the reference signal is used for the terminal apparatus 1 to calculate the downlink CSI. Furthermore, the reference signal may be used for a numerology such as a radio parameter or subcarrier spacing, or used for fine synchronization that allows FFT window synchronization to be achieved.

According to the present embodiment, at least one of the following downlink reference signals are used.

Demodulation Reference Signal (DMRS)
Channel State Information Reference Signal (CSI-RS)
Phrase Tracking Reference Signal (PTRS)
Mobility Reference Signal (MRS)

The DMRS is used to demodulate a modulated signal. Note that two types of reference signals may be defined as the DMRS: a reference signal for demodulating the PBCH and a reference signal for demodulating the PSCH or that both reference signals may be referred to as the DMRS. The CSI-RS is used for measurement of Channel State Information (CSI) and beam management. The PTRS is used to track phase according to movement of the terminal or the like. The MRS may be used to measure quality of reception from multiple base station apparatuses for handover. Furthermore, the reference signal may be defined as a reference signal for compensating for phase noise.

The downlink physical channels and/or the downlink physical signals are collectively referred to as a downlink signal. The uplink physical channels and/or the uplink physical signals are collectively referred to as an uplink signal. The downlink physical channels and/or the uplink physical channels are collectively referred to as a physical channel. The downlink physical signals and/or the uplink physical signals are collectively referred to as a physical signal.

The BCH, the UL-SCH, and the DL-SCH are transport channels. A channel used in the Medium Access Control (MAC) layer is referred to as a transport channel. A unit of the transport channel used in the MAC layer is also referred to as a Transport Block (TB) and/or a MAC Protocol Data Unit (PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and coding processing is performed for each codeword.

The reference signal may also be used for Radio Resource Measurement (RRM). The reference signal may also be used for beam management.

Beam management may be a procedure of the base station apparatus 3 and/or the terminal apparatus 1 for matching directivity of an analog and/or digital beam in a transmission apparatus (the base station apparatus 3 in the downlink and the terminal apparatus 1 in the uplink) with directivity of an analog and/or digital beam in a reception apparatus (the terminal apparatus 1 in the downlink and the base station apparatus 3 in the uplink) to acquire a beam gain.

Note that the beam management may include the following procedures.

Beam selection
Beam refinement
Beam recovery

For example, the beam selection may be a procedure for selecting a beam in communication between the base station apparatus 3 and the terminal apparatus 1. Furthermore, the beam refinement may be a procedure for selecting a beam having a higher gain or changing a beam to an optimum beam between the base station apparatus 3 and the terminal apparatus 1 according to the movement of the terminal apparatus 1. The beam recovery may be a procedure for re-selecting the beam in a case that the quality of a communication link is degraded due to blockage caused by a blocking object, a passing human being, or the like in communication between the base station apparatus 3 and the terminal apparatus 1.

For example, the CSI-RS or Quasi Co-Location (QCL) assumption may be used for the terminal apparatus 1 to select the transmit beam for the base station apparatus 3.

In a case that a long term property of a channel on which one symbol in one antenna port is carried may be estimated from a channel on which one symbol in the other antenna port is carried, the two antenna ports are said to be quasi co-located. The long term property of the channel includes at least one of a delay spread, a Doppler spread, a Doppler shift, an average gain, or an average delay. For example, in a case that an antenna port 1 and an antenna port 2 are quasi co-located with respect to the average delay, this means that a reception timing for the antenna port 2 may be estimated from a reception timing for the antenna port 1.

The QCL may also be expanded to beam management. For this purpose, spatially expanded QCL may be newly defined. For example, the long term property of a channel in spatial QCL assumption may be an Angle of Arrival (AoA), a Zenith angle of Arrival (ZoA), or the like and/or an angle spread, for example, Angle Spread of Arrival (ASA) or a Zenith angle Spread of Arrival (ZSA), a transmission angle (AoD, ZoD, or the like) or an angle spread of the transmission angle, for example, an Angle Spread of Departure (ASD) or a Zenith angle Spread of Departure (ZSS), or Spatial Correlation, in a radio link or channel.

According to this method, operation of the base station apparatus 3 and the terminal apparatus 1 equivalent to beam management may be defined as beam management based on the spatial QCL assumption and radio resources (time and/or frequency).

The subframe will now be described. The subframe in the embodiment may also be referred to as a resource unit, a radio frame, a time period, or a time interval.

Figure 2:
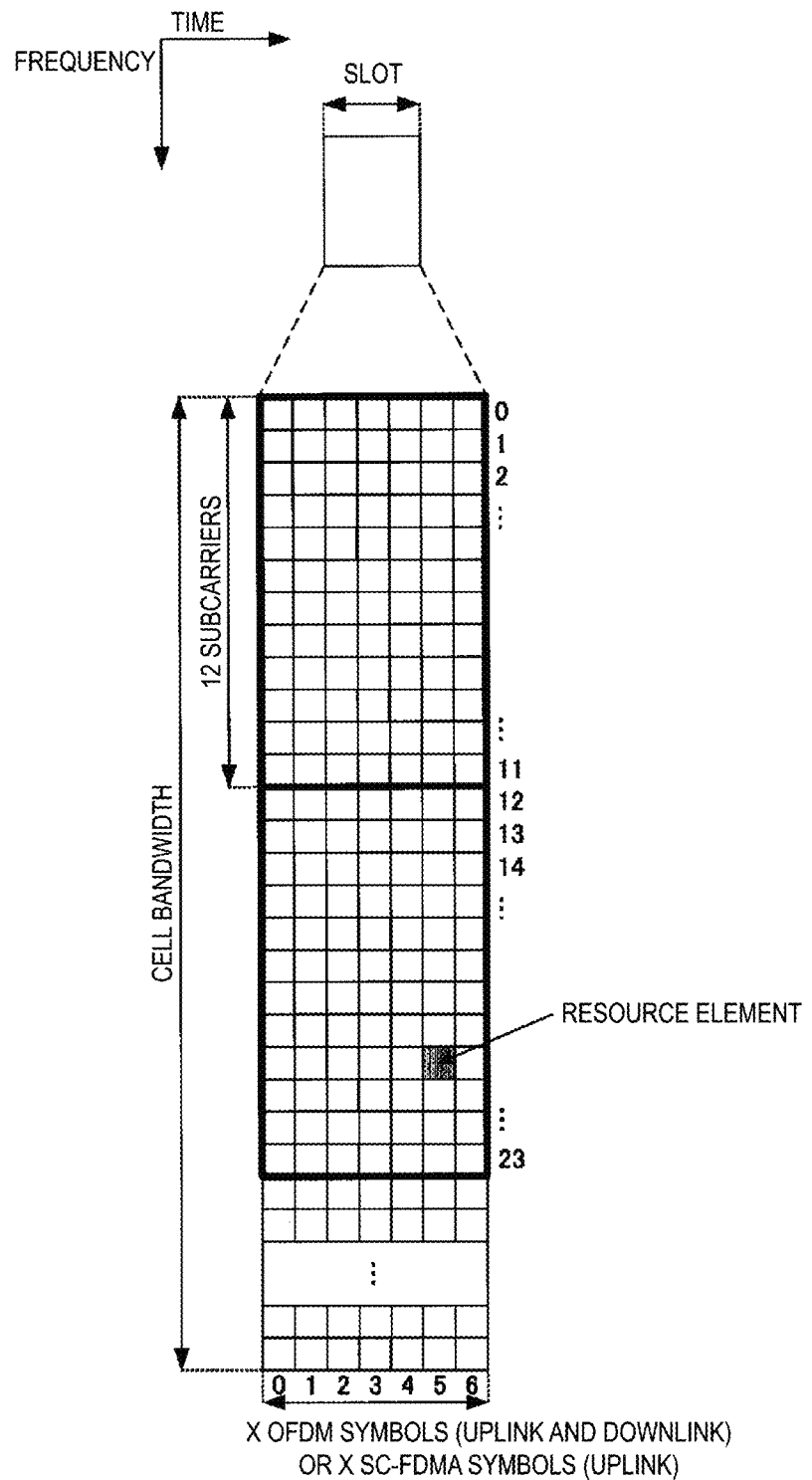
FIG. 2 is a diagram illustrating a schematic configuration of a downlink slot according to the present embodiment.

FIG. 2 is a diagram illustrating a schematic configuration of a downlink slot according to a first embodiment of the present invention. Each of the radio frames is 10 ms in length. Furthermore, each of the radio frames includes 10 subframes and X slots. In other words, the length of one subframe is 1 ms. For each of the slots, time length is defined based on subcarrier spacings. For example, in a case that the subcarrier spacing of an OFDM symbol is 15 kHz and Normal Cyclic Prefixes (NCPs) are used, X=7 or X=14, and X=7 and X=14 correspond to 0.5 ms and 1 ms, respectively. In addition, in a case that the subcarrier spacing is 60 kHz, X=7 or X=14, and X=7 and X=14 correspond to 0.125 ms and 0.25 ms, respectively. FIG. 2 illustrates a case of X=7 as an example. Note that a case of X=14 can be similarly configured by expanding the case of X=7. Furthermore, the uplink slot is defined similarly, and the downlink slot and the uplink slot may be defined separately.

The signal or the physical channel transmitted in each of the slots may be represented by a resource grid. The resource grid is defined by multiple subcarriers and multiple OFDM symbols. The number of subcarriers constituting one slot depends on each of the downlink and uplink bandwidths of a cell. Each element within the resource grid is referred to as a resource element. The resource element may be identified by using a subcarrier number and an OFDM symbol number.

A resource block is used to represent mapping of a certain physical downlink channel (such as the PDSCH) or a certain physical uplink channel (such as the PUSCH) to resource elements. As the resource block, a virtual resource block and a physical resource block are defined. A certain physical uplink channel is first mapped to a virtual resource block. Thereafter, the virtual resource block is mapped to a physical resource block. In a case that the number X of OFDM symbols included in a slot is 7 and NCPs are used, one physical resource block is defined by 7 consecutive OFDM symbols in the time domain and by 12 consecutive subcarriers in the frequency domain. Hence, one physical resource block includes (7×12) resource elements. In a case of Extended CPs (ECPs), one physical resource block is defined by 6 consecutive OFDM symbols in the time domain and by 12 consecutive subcarriers in the frequency domain. Hence, one physical resource block includes (6×12) resource elements. In this case, one physical resource block corresponds to one slot in the time domain and corresponds to 180 kHz in a case of a subcarrier spacing of 15 kHz (720 kHz in a case of 60 kHz) in the frequency domain. Physical resource blocks are numbered from 0 in the frequency domain.

Figure 3:
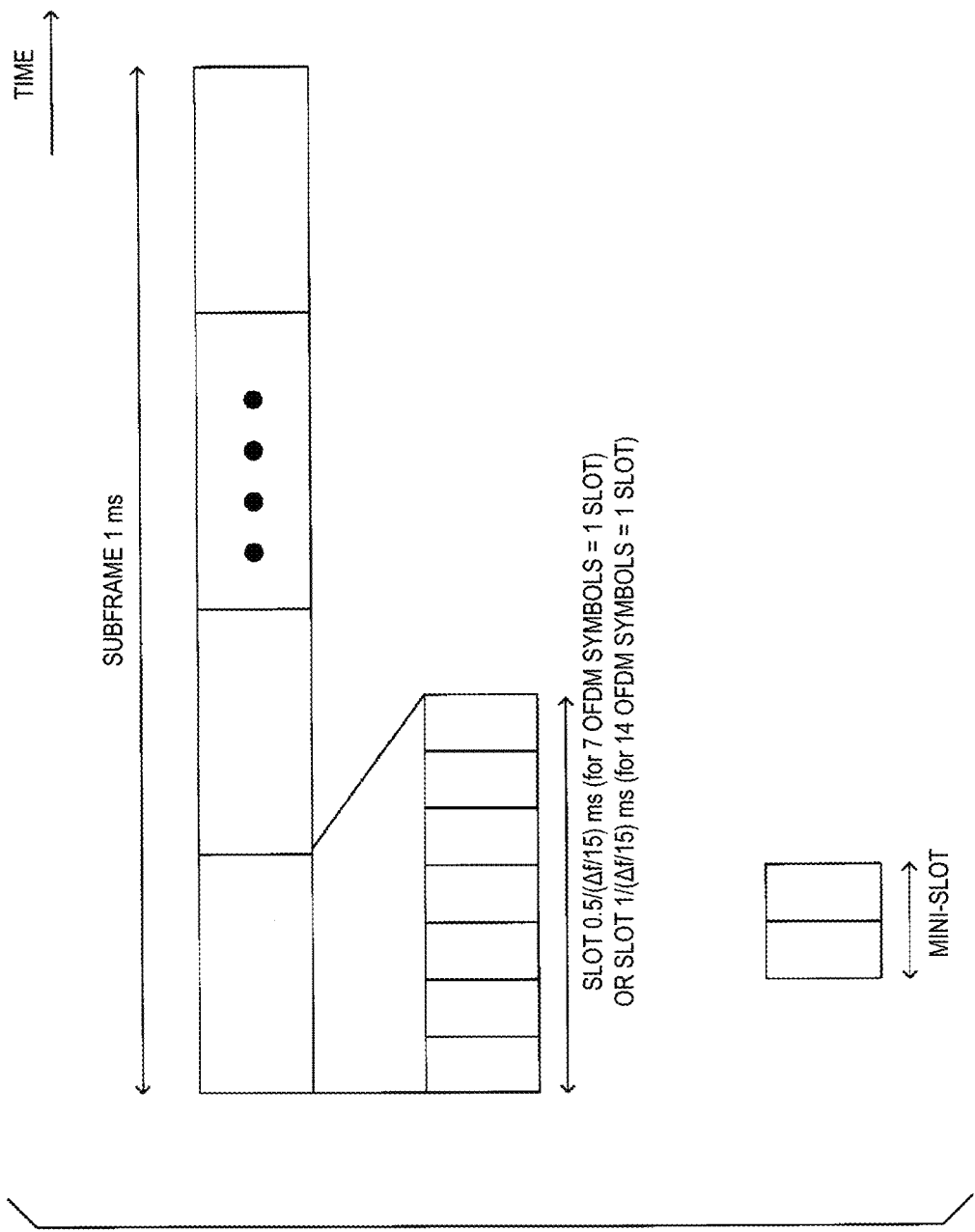
FIG. 3 is a diagram illustrating a relationship between a subframe and a slot and a mini-slot in a time domain.

The subframe, the slot, and a mini-slot will now be described. FIG. 3 is a diagram illustrating the relationship between the subframe and the slot and the mini-slot in the time domain. As illustrated in FIG. 3, three types of time units are defined. The subframe is 1 ms regardless of the subcarrier spacing. The number of OFDM symbols included in the slot is 7 or 14, and the slot length depends on the subcarrier spacing. Here, in a case that the subcarrier interval is 15 kHz, 14 OFDM symbols are included in one subframe. Thus, with the assumption that the subcarrier interval is $\Delta f$ (kHz), the slot length may be defined as $0.5/(\Delta f/15)$ ms in a case that the number of OFDM symbols constituting one slot is 7. Here, $\Delta f$ may be defined by subcarrier spacing (kHz). In addition, in a case that the number of OFDM symbols constituting one slot is 7, the slot length may be defined as $1/(\Delta f/15)$ ms. Here, $\Delta f$ may be defined by subcarrier spacing (kHz). Furthermore, the slot length may be defined as $X/14/(\Delta f/15)$ ms, where X is the number of OFDM symbols included in the slot.

The mini-slot (which may be referred to as a sub-slot) is a time unit including OFDM symbols that are less in number than the OFDM symbols included in the slot. FIG. 3 illustrates, by way of example, a case in which the mini-slot includes 2O FDM symbols. The OFDM symbols in the mini-slot may match the timing for the OFDM symbols constituting the slot. Note that the smallest unit of scheduling may be a slot or a mini-slot.

Figure 4:
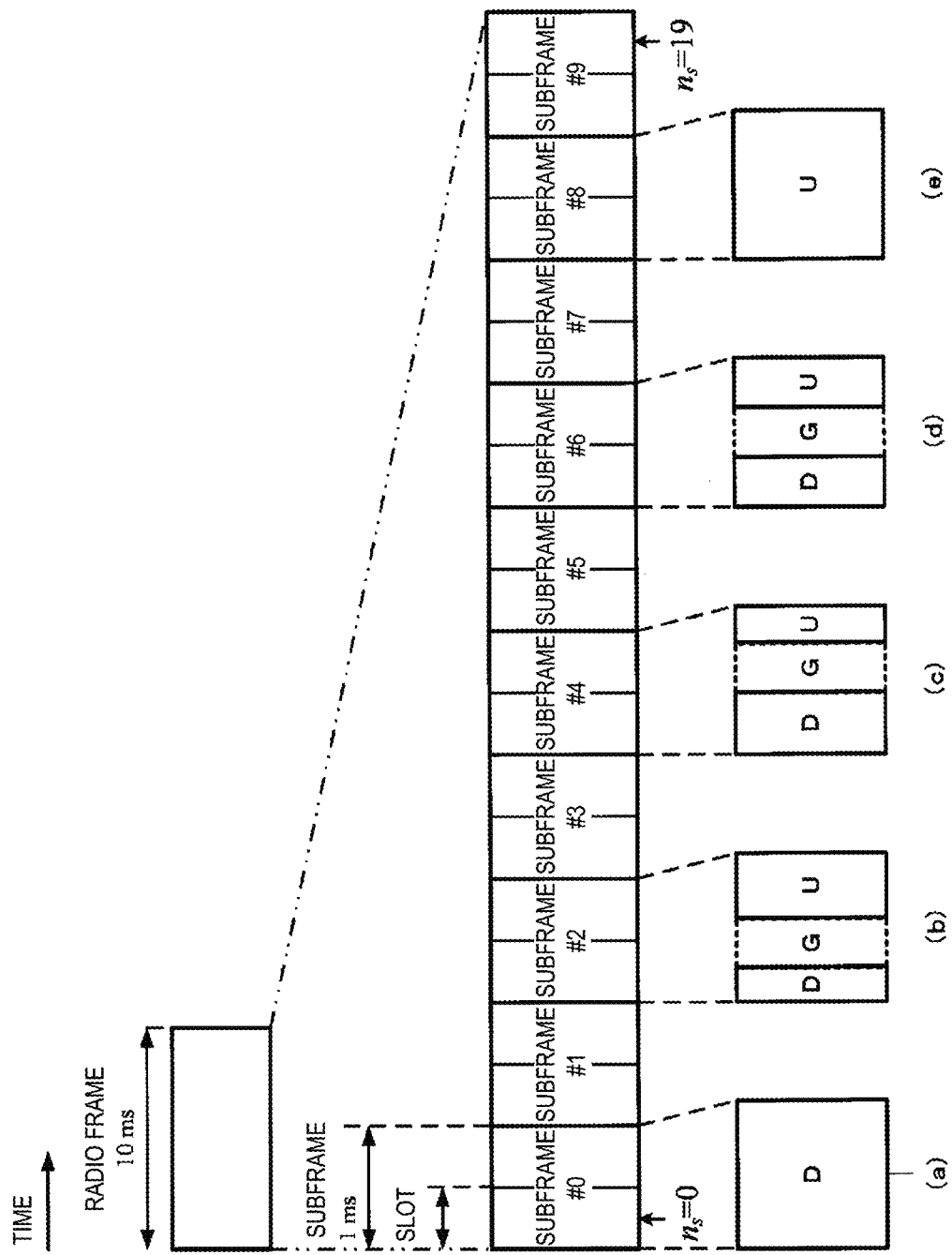
FIG. 4 is a diagram illustrating examples of a slot or a subframe.

FIG. 4 is a diagram illustrating examples of the slot or the subframe. Here, a case in which the slot length is 0.5 ms at a subcarrier spacing of 15 kHz is illustrated as an example. In FIG. 4, D represents the downlink, and U represents the uplink. As illustrated in FIG. 4, during a certain time interval (for example, the minimum time interval to be allocated to one UE in the system), the subframe may include at least one of the followings:

downlink part (duration),
gap, or
uplink part (duration).

Part (a) of FIG. 4 illustrates an example in which the entire subframe is used for downlink transmission during a certain time interval (for example, a minimum time resource unit that can be allocated to a UE, which may also be referred to as a time unit. Furthermore, a combination of a plurality of minimum time resource units may be referred to as a time unit). Part (b) of FIG. 4 illustrates an example in which an uplink is scheduled via a PCCH for example by using the first time resource, and an uplink signal is transmitted after a gap for a processing delay of the PCCH, a time for switching from a downlink to an uplink, and generation of a transmit signal. Part (c) of FIG. 4 illustrates an example in which a downlink PCCH and/or downlink PSCH are transmitted by using the first time resource, and a PSCH or PCCH is transmitted after a gap for a processing delay, a time for switching from a downlink to an uplink, and generation of a transmit signal. Here, for example, the uplink signal may be used to transmit the HARQ-ACK and/or CSI, namely, the UCI. Part (d) of FIG. 4 illustrates an example in which a downlink PCCH and/or a downlink PSCH are transmitted by using the first time resource, and a PSCH or PCCH is transmitted after a gap for a processing delay, a time for switching from a downlink to an uplink, and generation of a transmit signal. Here, for example, the uplink signal may be used to transmit the uplink data, namely, the UL-SCH. Part (e) of FIG. 4 illustrates an example in which the entire subframe is used for uplink transmission (uplink PSCH or PCCH).

The above-described downlink part and uplink part may include multiple OFDM symbols as is the case with LTE.

Figure 5:
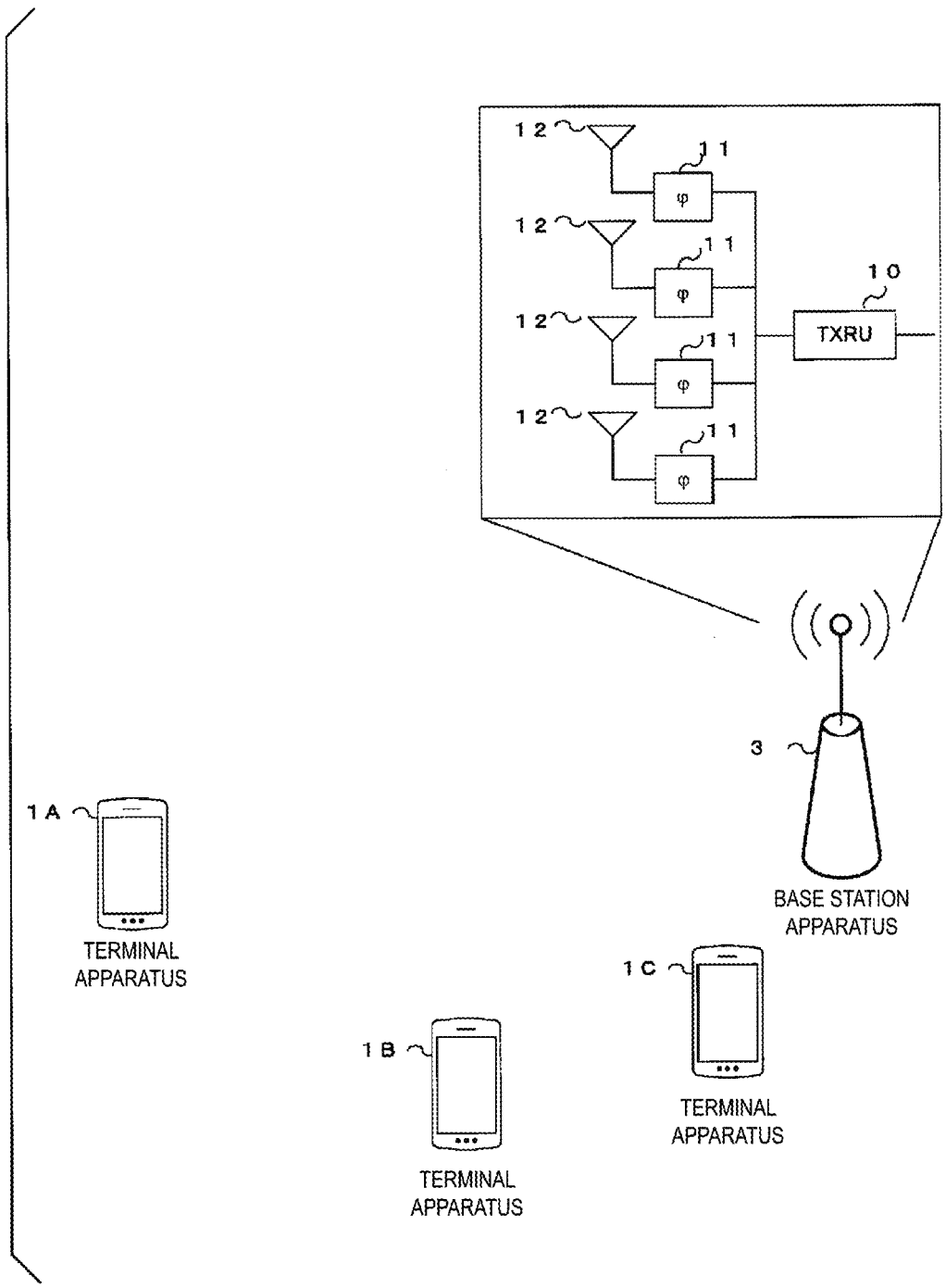
FIG. 5 is a diagram illustrating an example of beamforming.

FIG. 5 is a diagram illustrating an example of beamforming. Multiple antenna elements are connected to one Transceiver unit (TXRU) 10. The phase is controlled by using a phase shifter 11 for each antenna element and a transmission is performed from an antenna element 12, thus allowing a beam for a transmit signal to be directed in any direction. Typically, the TXRU may be defined as an antenna port, and only the antenna port may be defined for the terminal apparatus 1. Controlling the phase shifter 11 allows setting of directivity in any direction. Thus, the base station apparatus 3 can communicate with the terminal apparatus 1 by using a high gain beam.

Figure 6:
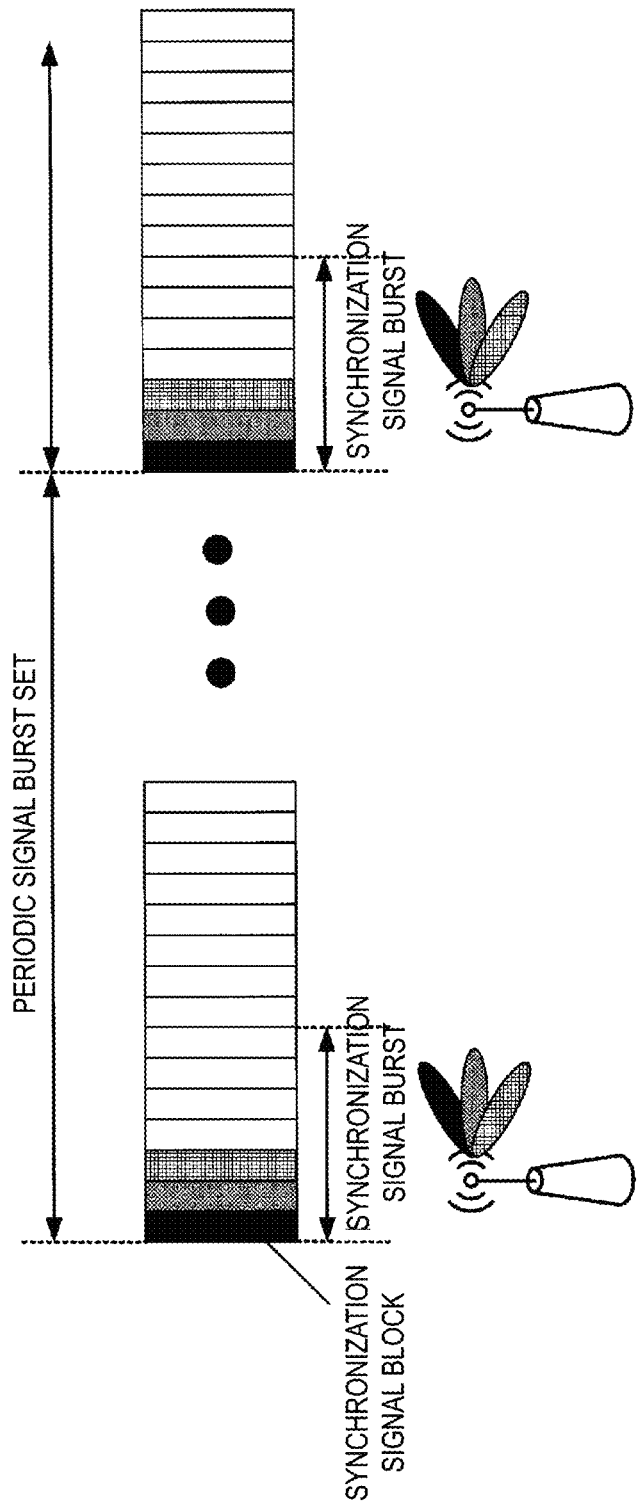
FIG. 6 is a diagram illustrating an example of a synchronization signal block, a synchronization signal burst, and a synchronization signal burst set.

FIG. 6 is a diagram illustrating an example of a synchronization signal block, a synchronization signal burst, and a synchronization signal burst set. FIG. 6 illustrates an example in which a synchronization signal burst set includes one synchronization signal burst, one synchronization signal burst includes three synchronization signal blocks, and the synchronization signal block includes one OFDM symbol.

The synchronization signal burst set includes at least one synchronization signal burst, and one synchronization signal burst includes at least one synchronization signal block. The synchronization signal block includes a time unit including one or more consecutive OFDM symbols. Note that the time unit included in the synchronization signal block may be shorter than the OFDM symbol length.

The synchronization signal burst set may be transmitted periodically. For example, a period used for initial access and a period configured for a connected (Connected or RRC_Connected) terminal apparatus may be defined. Furthermore, the period configured for the connected (Connected or RRC_Connected) terminal apparatus may be configured in the RRC layer. Additionally, the period configured for the connected (Connected or RRC_Connected) terminal may be a period of a radio resource in the time domain during which transmission is potentially to be performed, and in practice, whether the transmission is to be performed during the period may be determined by the base station apparatus 3. Furthermore, the period used for the initial access may be predefined in specifications or the like.

Furthermore, the subcarrier spacing for the PSS and the SSS used for the initial access is predefined in the specifications, and is configured for a connected terminal apparatus.

The synchronization signal burst set may be determined based on a System Frame Number (SFN). Furthermore, a starting position of the synchronization signal burst set (boundary) may be determined based on the SFN and the period.

The same beam may be assumed to be applied to synchronization signal bursts or synchronization signal blocks having the same relative time within each of multiple synchronization signal burst sets. In addition, antenna ports for synchronization signal bursts or synchronization signal blocks having the same relative time within each of multiple synchronization signal burst sets may be assumed to be quasi co-located with respect to the average delay, the Doppler shift, and the spatial correlation.

Among the multiple synchronization signal busts, the relative time position at which the synchronization signal bust is mapped may be fixed.

The synchronization signal burst may include at least one synchronization signal block in the synchronization signal burst. An antenna port for a synchronization signal block at a certain relative time within a synchronization signal burst may be assumed to be quasi co-located with an antenna port for a synchronization signal block at the same relative time within another synchronization signal burst with respect to the average delay, the Doppler shift, and the spatial correlation.

In a case that multiple synchronization signal bursts are included in a synchronization signal burst set, the relative time intervals between the multiple synchronization signal bursts in the synchronization signal burst set may be fixed. For example, in a case that a synchronization signal burst has a period of 15 ms and three synchronization signal bursts are included in the synchronization signal burst set, then synchronization signal bursts may be mapped at intervals of 5 ms.

The synchronization signal block may include at least one of the PSS, the SSS, or the PBCH. The PSS, SSS, and PBCH may be multiplexed in the time domain (TDM) or multiplexed in the frequency domain (FDM). Additionally, at least one of the PSS, SSS, or PBCH may be included in the synchronization signal block.

Figure 7A:
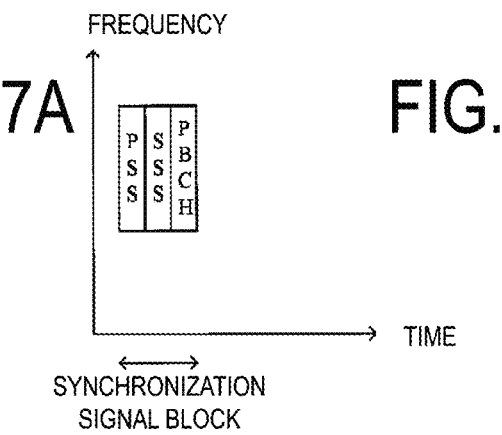
FIGS. 7A to 7F are diagrams illustrating examples of a multiplexing method for PSS, SSS, and PBCH in a synchronization signal block.
Figure 7D:
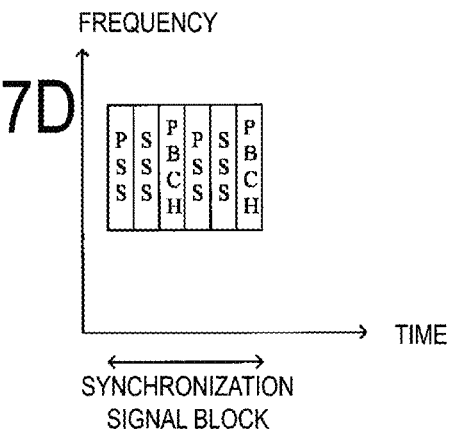
Figure 7B:
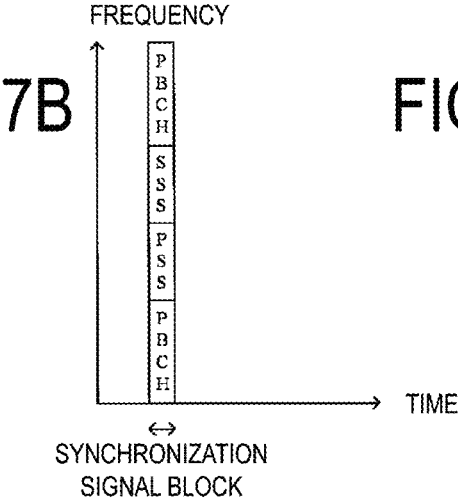
Figure 7E:
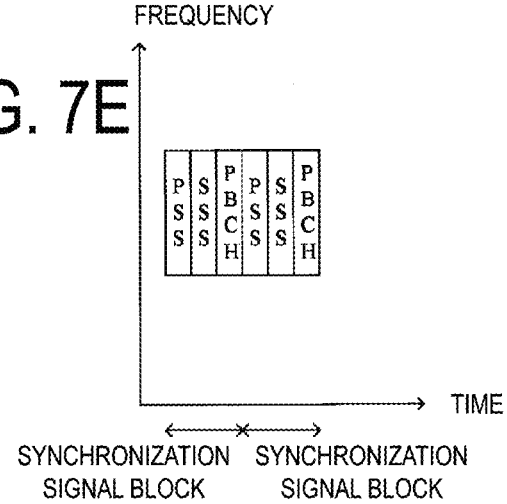
Figure 7C:
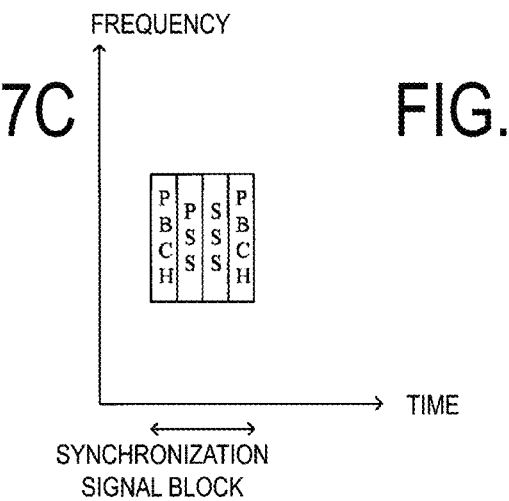
Figure 7F:
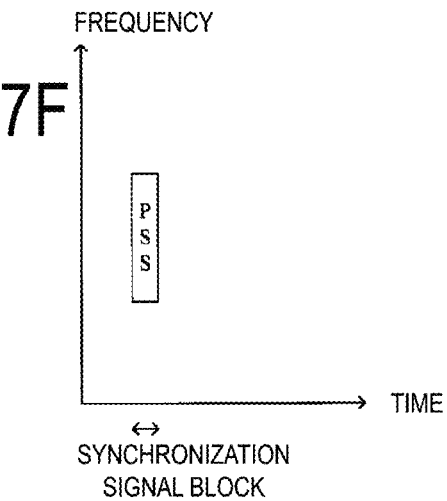

FIGS. 7A to 7F are diagrams illustrating examples of a multiplexing method for the PSS, SSS, and PBCH in the synchronization signal block. FIG. 7A is a diagram illustrating an example in which the PSS, SSS, and PBCH are time-multiplexed one at a time in one synchronization signal block. FIG. 7B is a diagram illustrating an example in which the PSS, SSS, and PBCH are frequency-multiplexed in one synchronization signal block. FIG. 7C is a diagram illustrating an example in which the PBCH, PSS, SSS, and PBCH are time-multiplexed in one synchronization signal block. Here, the first PBCH and the last PBCH in the synchronization signal block may be the same. FIG. 7D is a diagram illustrating an example in which the same signal sequence is transmitted twice in the order of PSS, SSS, and PBCH within one synchronization signal block. Note that the PSS, SSS, and PBCH may be defined as being mapped to multiple time and/or frequency resources. Furthermore, the PSS, SSS, and PBCH may be defined as being repeated X times (X=2 in the example of FIG. 7D) within the synchronization signal block. Furthermore, the PSS, SSS, and PBCH may be defined as being retransmitted Y times (Y=1 in the example of FIG. 7D). Furthermore, the PSS, SSS, and PBCH may be defined as being retransmitted. In FIG. 7E, the PSS, SSS, and PBCH are time-multiplexed in one synchronization signal block, and the same PSS, SSS, and PBCH are multiplexed in the next synchronization signal block. In this case, the synchronization signal block may be defined as being repeated X times (X=2 in the example of FIG. 7E). Furthermore, the synchronization signal block may be defined as being retransmitted Y times (Y=1 in the example of FIG. 7E). Note that one synchronization signal block may be defined as being mapped to multiple times and/or frequency resources. FIG. 7F is a diagram illustrating an example in which one synchronization signal block includes only the PSS. In FIG. 7F, only the PSS may be included in one synchronization signal block in one synchronization signal burst, and the corresponding SSS and/or PBCH may be included in another synchronization signal burst in the same synchronization signal burst set. Furthermore, the corresponding SSS and/or PBCH may be included in a synchronization signal burst in another synchronization signal burst set. Time multiplexing and frequency multiplexing may be defined in combination. For example, the multiplexing method may be such that the PSS and SSS is frequency-multiplexed, whereas the PSS/SSS and PBCH is time-multiplexed. These are merely examples and may be applied in combination to any signal and channel. Furthermore, in a case of time multiplexing, the radio resources may be consecutive or inconsecutive. Furthermore, in a case of frequency multiplexing, the radio resources may be allocated at consecutive or inconsecutive frequency positions.

The number of synchronization signal blocks may be defined, for example, as the number of synchronization signal blocks within the synchronization signal burst. Furthermore, the number of synchronization signal blocks may indicate the number of beam groups for cell selection within the synchronization signal burst. Here, the beam group may be defined as the number of synchronization signal blocks included in a synchronization signal burst or the number of different beams. As for beam, an antenna port used for the terminal apparatus 1 to transmit each synchronization signal block within the synchronization signal burst may be defined by the number of synchronization signal blocks that are not quasi co-located with respect to spatial correlation.

The terminal apparatus for the synchronization signal block may indicate the number of beams in the beam group or the synchronization signal burst. For example, in FIGS. 7A to 7D and FIG. 7F, in a case that one beam is applied in the synchronization signal block, the number of beams in the synchronization signal burst is the number of synchronization signal blocks being transmitted in the synchronization signal burst. In the case of FIG. 7G, the number of beams may be the number of synchronization signal blocks/2 because the synchronization signal blocks are transmitted twice by using the same beam.

Furthermore, the number of synchronization signal blocks within the synchronization signal burst predefined in the specifications may indicate the maximum value of the number of potential synchronization signal blocks within the synchronization signal burst. In addition, a synchronization signal burst time length predefined in the specifications may be defined as an integer multiple of a slot length or a subframe length, or may be defined based on a slot length or a subframe length such as half or one third of the slot length or the subframe length. Additionally, the synchronization signal burst time length may be defined based on the OFDM symbol length or the minimum time (Ts) instead of the slot length or the subframe length.

Now, a method for indicating the number of synchronization signal blocks in the synchronization signal burst will be described. The number of synchronization signal blocks may be indicated by an identity generating the PSS and/or SSS.

In a case that the PSS and/or SSS is a Zadoff-Chu sequence, a sequence index may indicate the number of synchronization signal blocks in the synchronization signal burst. The Zadoff-Chu sequence is represented by Equation 1.

$$d_u(n) = e^{-j\pi \frac{un(n+1)}{N}},\qquad \text{Equation 1}$$

where N is a sequence length, n is the n-th value in the sequence (n=0, 1, ... N−1), and u is a sequence index (u is a value not greater than N). The value of u may be determined based at least on the number of synchronization signal blocks in the synchronization signal burst. The value of u may be further based on the cell ID or a value based on the cell ID.

In a case that the PSS and/or SSS is an M sequence (Pseudo-Noise (PN) sequence, Gold sequence, or the like), an initial value of a shift register may be determined based at least on the number of synchronization signal blocks in the synchronization signal burst. The initial value of the shift register may be further based on the cell ID or the value based on the cell ID.

In a case that the PSS and/or SSS further includes a cover code (for example, a cyclic shift or a Hadamard sequence), a parameter for determining the amount of cyclic shift or a row index of the Hadamard sequence may be determined based at least on the number of synchronization signal blocks within the synchronization signal burst. The parameter for determining the amount of cyclic shift or the row index of the Hadamard sequence may be further based on the cell ID or the value based on the cell ID.

Additionally, the number of synchronization signal blocks within the synchronization signal burst may be included in MIB transmitted in the PBCH or system information.

The terminal apparatus 1 measures the reception quality (for example, RSRP, RSRQ, RS-SINR, and the like obtained by RRM measurement) based on the number of synchronization signal blocks in the synchronization signal burst. In this case, measured values may be averaged among the synchronization signal blocks in the synchronization signal burst.

Furthermore, the average value for X synchronization signal blocks in the synchronization signal burst (X may be 1. X may be an integer greater than or equal to 2) may be measurement for cell selection. In this case, the number of synchronization signal blocks in the synchronization signal burst need not be indicated.

In this way, bits can be reduced by indicating only the number of multiple synchronization signal blocks instead of indicating the configuration of the synchronization signal blocks.

An aspect of the present embodiment may be operated in carrier aggregation or dual connectivity with the Radio Access Technologies (RAT) such as LTE and LTE-A/LTE-A Pro. In this case, the aspect may be used for some or all of the cells or cell groups, or the carriers or carrier groups (e.g., Primary Cells (PCells), Secondary Cells (SCells), Primary Secondary Cells (PSCells), Master Cell Groups (MCGs), or Secondary Cell Groups (SCGs)). Moreover, the aspect may be independently operated and used in a stand-alone manner.

Configurations of apparatuses according to the present embodiment will be described below. Here, an example is illustrated in which CP-OFDM is applied as a downlink radio transmission scheme, and CP DFTS-OFDM (SC-FDM) is applied as an uplink radio transmission scheme.

Figure 8:
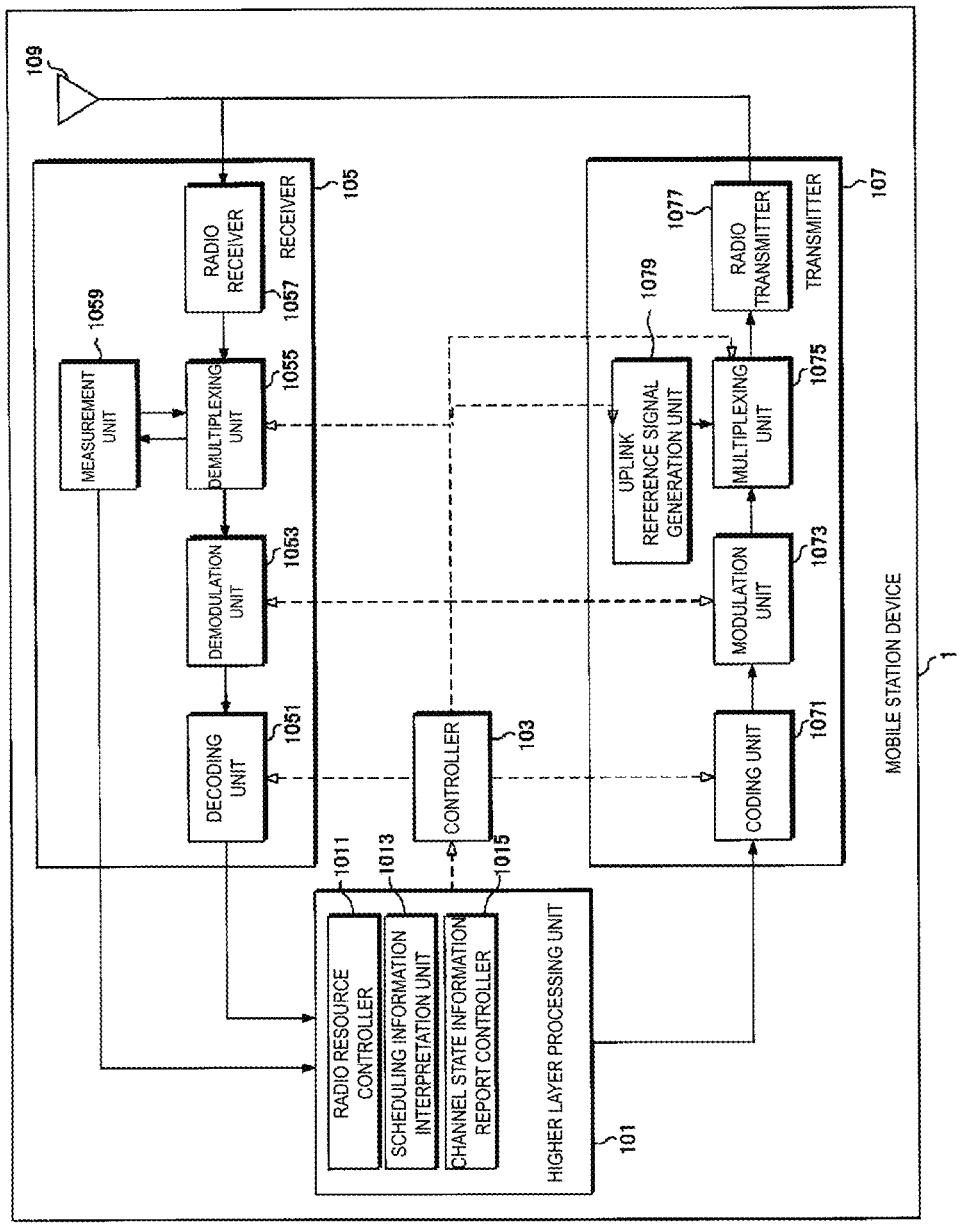
FIG. 8 is a schematic block diagram illustrating a configuration of a terminal apparatus 1 according to the present embodiment.

FIG. 8 is a schematic block diagram illustrating a configuration of the terminal apparatus 1 according to the present embodiment. As illustrated in, the terminal apparatus 1 is configured to include a higher layer processing unit 101, a controller 103, a receiver 105, a transmitter 107, and a transmit and/or receive antenna 109. Furthermore, the higher layer processing unit 101 is configured to include a radio resource controller 1011, a scheduling information interpretation unit 1013, and a Channel State Information (CSI) report controller 1015. Furthermore, the receiver 105 is configured to include a decoding unit 1051, a demodulation unit 1053, a demultiplexing unit 1055, a radio receiver 1057, and a measurement unit 1059. The transmitter 107 is configured to include a coding unit 1071, a modulation unit 1073, a multiplexing unit 1075, a radio transmitter 1077, and an uplink reference signal generation unit 1079.

The higher layer processing unit 101 outputs the uplink data (the transport block) generated by a user operation or the like, to the transmitter 107. The higher layer processing unit 101 performs processing of the Medium Access Control (MAC) layer, the Packet Data Convergence Protocol (PDCP) layer, the Radio Link Control (RLC) layer, and the Radio Resource Control (RRC) layer.

The radio resource controller 1011 included in the higher layer processing unit 101 manages various pieces of configuration information of the terminal apparatus 1. Furthermore, the radio resource controller 1011 generates information to be mapped to each uplink channel, and outputs the generated information to the transmitter 107.

The scheduling information interpretation unit 1013 included in the higher layer processing unit 101 interprets the DCI format (scheduling information) received through the receiver 105, generates control information for control of the receiver 105 and the transmitter 107, in accordance with a result of interpreting the DCI format, and outputs the generated control information to the controller 103.

The CSI report controller 1015 indicates to the measurement unit 1059 to derive Channel State Information (RI/PMI/CQI/CRI) relating to the CSI reference resource. The CSI report controller 1015 indicates to the transmitter 107 to transmit RI/PMI/CQI/CRI. The CSI report controller 1015 sets a configuration that is used in a case that the measurement unit 1059 calculates CQI.

In accordance with the control information from the higher layer processing unit 101, the controller 103 generates a control signal for control of the receiver 105 and the transmitter 107. The controller 103 outputs the generated control signal to the receiver 105 and the transmitter 107 to control the receiver 105 and the transmitter 107.

In accordance with the control signal input from the controller 103, the receiver 105 demultiplexes, demodulates, and decodes a reception signal received from the base station apparatus 3 through the transmit and/or receive antenna 109, and outputs the decoded information to the higher layer processing unit 101.

The radio receiver 1057 converts (down-converts) a downlink signal received through the transmit and/or receive antenna 109 into a signal of an intermediate frequency, removes unnecessary frequency components, controls an amplification level in such a manner as to suitably maintain a signal level, performs orthogonal demodulation based on an in-phase component and an orthogonal component of the received signal, and converts the resulting orthogonally-demodulated analog signal into a digital signal. The radio receiver 1057 removes a portion corresponding to a Guard Interval (GI) from the digital signal resulting from the conversion, performs Fast Fourier Transform (FFT) on the signal from which the Guard Interval has been removed, and extracts a signal in the frequency domain.

The demultiplexing unit 1055 demultiplexes the extracted signal into the downlink PCCH, the downlink PSCH, and the downlink reference signal. Furthermore, the demultiplexing unit 1055 performs channel compensation for the PCCH and PSCH based on the channel estimate value input from the measurement unit 1059. Furthermore, the demultiplexing unit 1055 outputs the downlink reference signal resulting from the demultiplexing, to the measurement unit 1059.

The demodulation unit 1053 demodulates the downlink PCCH and outputs a signal resulting from the demodulation to the decoding unit 1051. The decoding unit 1051 attempts to decode the PCCH. In a case of succeeding in the decoding, the decoding unit 1051 outputs downlink control information resulting from the decoding and an RNTI to which the downlink control information corresponds, to the higher layer processing unit 101.

The demodulation unit 1053 demodulates the PSCH in compliance with a modulation scheme notified with the downlink grant, such as Quadrature Phase Shift Keying (QPSK), 16 Quadrature Amplitude Modulation (QAM), 64 QAM, or 256 QAM and outputs a signal resulting from the demodulation to the decoding unit 1051. The decoding unit 1051 performs decoding in accordance with information of a transmission or an original coding rate notified with the downlink control information, and outputs, to the higher layer processing unit 101, the downlink data (the transport block) resulting from the decoding.

The measurement unit 1059 performs downlink path loss measurement, channel measurement, and/or interference measurement from the downlink reference signal input from the demultiplexing unit 1055. The measurement unit 1059 outputs, to the higher layer processing unit 101, the measurement result and CSI calculated based on the measurement result. Furthermore, the measurement unit 1059 calculates a downlink channel estimate value from the downlink reference signal and outputs the calculated downlink channel estimate value to the demultiplexing unit 1055.

The transmitter 107 generates the uplink reference signal in accordance with the control signal input from the controller 103, codes and modulates the uplink data (the transport block) input from the higher layer processing unit 101, multiplexes the PUCCH, the PUSCH, and the generated uplink reference signal, and transmits a signal resulting from the multiplexing to the base station apparatus 3 through the transmit and/or receive antenna 109.

The coding unit 1071 codes the Uplink Control Information and the uplink data input from the higher layer processing unit 101. The modulation unit 1073 modulates the coded bits input from the coding unit 1071, in compliance with a modulation scheme such as BPSK, QPSK, 16 QAM, 64 QAM, or 256 QAM.

The uplink reference signal generation unit 1079 generates a sequence determined according to a prescribed rule (formula), based on a physical cell identity (also referred to as a Physical Cell Identity (PCI), a cell ID, or the like) for identifying the base station apparatus 3, a bandwidth in which the uplink reference signal is mapped, a cyclic shift notified with the uplink grant, a parameter value for generation of a DMRS sequence, and the like.

Based on the information used for the scheduling of PUSCH, the multiplexing unit 1075 determines the number of PUSCH layers to be spatially-multiplexed, maps multiple pieces of uplink data to be transmitted on the same PUSCH to multiple layers through Multiple Input Multiple Output Spatial Multiplexing (MIMO SM), and performs precoding on the layers.

In accordance with the control signal input from the controller 103, the multiplexing unit 1075 performs Discrete Fourier Transform (DFT) on modulation symbols of the PSCH. Furthermore, the multiplexing unit 1075 multiplexes PCCH and PSCH signals and the generated uplink reference signal for each transmit antenna port. To be more specific, the multiplexing unit 1075 maps the PCCH and PSCH signals and the generated uplink reference signal to the resource elements for each transmit antenna port.

The radio transmitter 1077 performs Inverse Fast Fourier Transform (IFFT) on a signal resulting from the multiplexing to perform modulation in compliance with an SC-FDMA scheme, adds the Guard Interval to the SC-FDM-modulated SC-FDM symbol to generate a baseband digital signal, converts the baseband digital signal into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency, removes unnecessary frequency components, performs power amplification, and outputs a final result to the transmit and/or receive antenna 109 for transmission.

Figure 9:
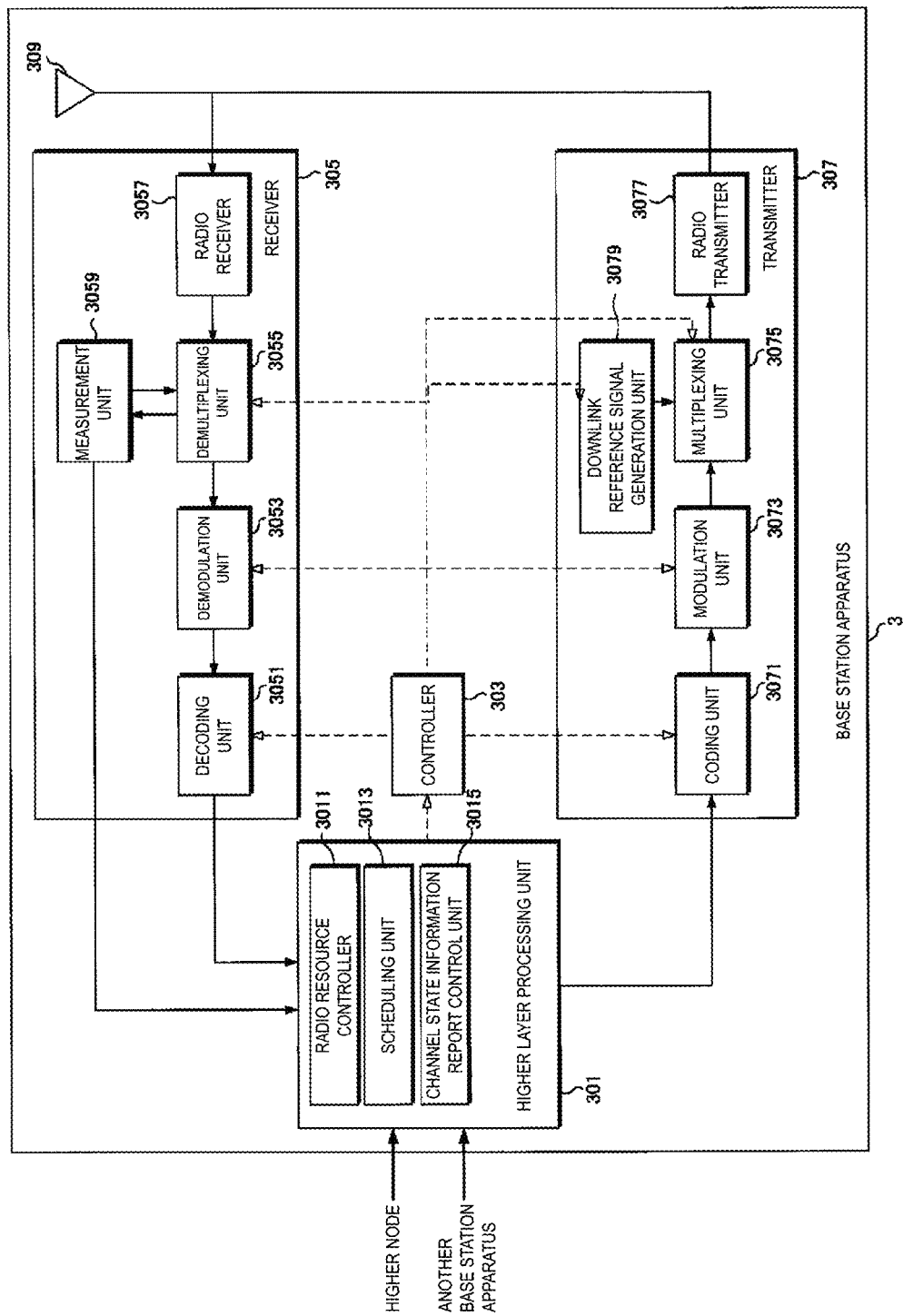
FIG. 9 is a schematic block diagram illustrating a configuration of a base station apparatus 3 according to the present embodiment.

FIG. 9 is a schematic block diagram illustrating a configuration of the base station apparatus 3 according to the present embodiment. As is illustrated, the base station apparatus 3 is configured to include a higher layer processing unit 301, a controller 303, a receiver 305, a transmitter 307, and a transmit and/or receive antenna 309. The higher layer processing unit 301 is configured to include a radio resource controller 3011, a scheduling unit 3013, and a CSI report controller 3015. The receiver 305 is configured to include a decoding unit 3051, a demodulation unit 3053, a demultiplexing unit 3055, a radio receiver 3057, and a measurement unit 3059. The transmitter 307 is configured to include a coding unit 3071, a modulation unit 3073, a multiplexing unit 3075, a radio transmitter 3077, and a downlink reference signal generation unit 3079.

The higher layer processing unit 301 performs processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 301 generates control information for control of the receiver 305 and the transmitter 307, and outputs the generated control information to the controller 303.

The radio resource controller 3011 included in the higher layer processing unit 301 generates, or acquires from a higher node, the downlink data (the transport block) mapped to the downlink PSCH, system information, the RRC message, the MAC Control Element (CE), and the like, and outputs a signal resulting from the generation or the acquirement to the transmitter 307. Furthermore, the radio resource control unit 3011 manages various configuration information for each of the terminal apparatuses 1.

The scheduling unit 3013 included in the higher layer processing unit 301 determines a frequency and a subframe to which the physical channel (PSCH) is allocated, the transmission coding rate and modulation scheme for the physical channel (PSCH), the transmit power, and the like, from the received CSI and from the channel estimate value, channel quality, or the like input from the measurement unit 3059. The scheduling unit 3013 generates the control information for control of the receiver 305 and the transmitter 307 in accordance with a result of the scheduling, and outputs the generated information to the controller 303. The scheduling unit 3013 generates the information (e.g., the DCI format) to be used for the scheduling of the physical channel (PSCH), based on the result of the scheduling.

The CSI report controller 3015 included in the higher layer processing unit 301 controls a CSI report to be performed by the terminal apparatus 1. The CSI report controller 3015 transmits information, assumed in order for the terminal apparatus 1 to derive RI/PMI/CQI in the CSI reference resource, for indicating various configurations, to the terminal apparatus 1 through the transmitter 307.

Based on the control information from the higher layer processing unit 301, the controller 303 generates a control signal for controlling the receiver 305 and the transmitter 307. The controller 303 outputs the generated control signal to the receiver 305 and the transmitter 307 to control the receiver 305 and the transmitter 307.

In accordance with the control signal input from the controller 303, the receiver 305 demultiplexes, demodulates, and decodes the reception signal received from the terminal apparatus 1 through the transmit and/or receive antenna 309, and outputs information resulting from the decoding to the higher layer processing unit 301. The radio receiver 3057 converts (down-converts) an uplink signal received through the transmit and/or receive antenna 309 into a signal of an intermediate frequency, removes unnecessary frequency components, controls the amplification level in such a manner as to suitably maintain a signal level, performs orthogonal demodulation based on an in-phase component and an orthogonal component of the received signal, and converts the resulting orthogonally-demodulated analog signal into a digital signal.

The radio receiver 3057 removes a portion corresponding to the Guard Interval (GI) from the digital signal resulting from the conversion. The radio receiver 3057 performs Fast Fourier Transform (FFT) on the signal from which the Guard Interval has been removed, extracts a signal in the frequency domain, and outputs the resulting signal to the demultiplexing unit 3055.

The demultiplexing unit 1055 demultiplexes the signal input from the radio receiver 3057 into signals such as the PCCH, the PSCH, and the uplink reference signal. The demultiplexing is performed based on radio resource allocation information, predetermined by the base station apparatus 3 using the radio resource controller 3011, that is included in the uplink grant notified to each of the terminal apparatuses 1. Furthermore, the demultiplexing unit 3055 performs channel compensation of the PCCH and the PSCH based on the channel estimate value input from the measurement unit 3059. Furthermore, the demultiplexing unit 3055 outputs an uplink reference signal resulting from the demultiplexing, to the measurement unit 3059.

The demodulation unit 3053 performs Inverse Discrete Fourier Transform (IDFT) on the PSCH, acquires modulation symbols, and demodulates a reception signal for each of the modulation symbols in the PCCH and the PSCH, in compliance with a predetermined modulation scheme such as Binary Phase Shift Keying (BPSK), QPSK, 16 QAM, 64 QAM, or 256 QAM, or in compliance with the modulation scheme that the base station apparatus 3 notifies in advance to each of the terminal apparatuses 1 with the uplink grant. The demodulation unit 3053 demultiplexes the modulation symbols of multiple pieces of uplink data transmitted in the same PSCH with the MIMO SM, based on the number of spatially-multiplexed sequences notified in advance with the uplink grant to each of the terminal apparatuses 1 and information for indicating the precoding to be performed on the sequences.

The decoding unit 3051 decodes the coded bits of the PCCH and the PSCH, which have been demodulated, in compliance with a predetermined coding scheme by using the transmission or original coding rate that is predetermined or notified in advance with the uplink grant to the terminal apparatus 1 by the base station apparatus 3, and outputs the decoded uplink data and uplink control information to the higher layer processing unit 101. In a case that the PSCH is retransmitted, the decoding unit 3051 performs the decoding with the coded bits, input from the higher layer processing unit 301, that are retained in an HARQ buffer, and the coded bits that have been demodulated. The measurement unit 309 measures the channel estimate value, the channel quality, and the like, based on the uplink reference signal input from the demultiplexing unit 3055, and outputs a signal resulting from the measurement to the demultiplexing unit 3055 and the higher layer processing unit 301.

The transmitter 307 generates the downlink reference signal in accordance with the control signal input from the controller 303, codes and modulates the downlink control information and the downlink data that are input from the higher layer processing unit 301, multiplexes the PCCH, the PSCH, and the downlink reference signal and transmits a signal resulting from the multiplexing to the terminal apparatus 1 through the transmit and/or receive antenna 309 or transmits the PCCH, the PSCH, and the downlink reference signal to the terminal apparatus 1 through the transmit and/or receive antenna 309 by using separate radio resources.

The coding unit 3071 codes the downlink control information and the downlink data input from the higher layer processing unit 301. The modulation unit 3073 modulates the coded bits input from the coding unit 3071, in compliance with a modulation scheme such as BPSK, QPSK, 16 QAM, 64 QAM, and 256 QAM.

The downlink reference signal generation unit 3079 generates, as the downlink reference signal, a sequence known to the terminal apparatus 1, the sequence being determined in accordance with a predetermined rule based on the physical cell identity (PCI) for identifying the base station apparatus 3, or the like.

The multiplexing unit 3075, in accordance with the number of PSCH layers to be spatially-multiplexed, maps at least one piece of downlink data to be transmitted in one PSCH to at least one layer, and performs precoding for the at least one layer. The multiplexing unit 375 multiplexes the downlink physical channel signal and the downlink reference signal for each transmit antenna port. Furthermore, the multiplexing unit 375 maps the downlink physical channel signal and the downlink reference signal in the resource element for each transmit antenna port.

The radio transmission unit 3077 performs Inverse Fast Fourier Transform (IFFT) on the modulation symbol resulting from the multiplexing or the like to perform the modulation in compliance with an OFDM scheme, adds the Guard Interval to the OFDM-modulated OFDM symbol to generate a baseband digital signal, converts the baseband digital signal into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency, removes unnecessary frequency components, performs power amplification, and outputs a final result to the transmit and/or receive antenna 309 for transmission.

(1) More specifically, according to a first aspect of the present invention, a terminal apparatus 1 for communicating with a base station apparatus is provided, the terminal apparatus 1 including a receiver configured to receive at least one synchronization signal burst periodically transmitted, wherein a first synchronization signal and a second synchronization signal are mapped at a particular time position in a radio frame, each of the at least one synchronization signal burst includes at least one synchronization signal block, each of the at least one synchronization signal block includes at least one of the first synchronization signal, the second synchronization signal, or a physical broadcast channel, and the receiver receives, from the base station apparatus, information for indicating the number of the at least one synchronization signal block included in each of the at least one synchronization signal burst.

(2) In the above-described first aspect, the number of the at least one synchronization signal block is indicated by an index for generating a sequence of at least one of the first synchronization signal or the second synchronization signal.

(3) In the above-described first aspect, the number of the at least one synchronization signal block is indicated by a master information block transmitted in the physical broadcast channel.

(4) According to a second aspect of the present invention, a base station apparatus 3 for communicating with a terminal apparatus is provided, the base station apparatus including a transmitter configured to transmit at least one synchronization signal burst periodically transmitted, wherein a first synchronization signal and a second synchronization signal are mapped at a particular time position in a radio frame, each of the at least one synchronization signal burst includes at least one synchronization signal block, each of the at least one synchronization signal block includes at least one of the first synchronization signal, the second synchronization signal, or a physical broadcast channel, and the transmitter transmits, from the base station apparatus, information for indicating the number of the at least one synchronization signal block included in each of the at least one synchronization signal burst.

(5) In the above-described first aspect, the number of the at least one synchronization signal block is indicated by an index for generating a sequence of at least one of the first synchronization signal or the second synchronization signal.

(6) In the above-described first aspect, the number of the at least one synchronization signal block is indicated by a master information block transmitted in the physical broadcast channel.

(7) According to a third aspect of the present invention, a communication method for a terminal apparatus for communicating with a base station apparatus is provided, the communication method including the step of receiving at least one synchronization signal burst periodically transmitted, wherein a first synchronization signal and a second synchronization signal are mapped at a particular time position in a radio frame, each of the at least one synchronization signal burst includes at least one synchronization signal block, each of the at least one synchronization signal block includes at least one of the first synchronization signal, the second synchronization signal, or a physical broadcast channel, and information for indicating the number of the at least one synchronization signal block included in each of the at least one synchronization signal burst is received from the base station apparatus.

(8) According to a fourth aspect of the present invention, a communication method for a base station apparatus for communicating with a terminal apparatus is provided, the communication method including the step of transmitting at least one synchronization signal burst periodically transmitted, wherein a first synchronization signal and a second synchronization signal are mapped at a particular time position in a radio frame, each of the at least one synchronization signal burst includes at least one synchronization signal block, each of the at least one synchronization signal block includes at least one of the first synchronization signal, the second synchronization signal, or a physical broadcast channel, and information for indicating the number of the at least one synchronization signal block included in each of the at least one synchronization signal burst is transmitted from the base station apparatus.

(9) According to a fifth aspect of the present invention, an integrated circuit implemented in a terminal apparatus for communicating with a base station apparatus is provided, the integrated circuit including a receiver configured to receive at least one synchronization signal burst periodically transmitted, wherein a first synchronization signal and a second synchronization signal are mapped at a particular time position in a radio frame, each of the at least one synchronization signal burst includes at least one synchronization signal block, each of the at least one synchronization signal block includes at least one of the first synchronization signal, the second synchronization signal, or a physical broadcast channel; and the receiver receives, from the base station apparatus, information for indicating the number of the at least one synchronization signal block included in each of the at least one synchronization signal burst.

(10) According to a sixth aspect of the present invention, an integrated circuit implemented in a base station apparatus for communicating with a terminal apparatus is provided, the integrated circuit including a transmitter configured to transmit at least one synchronization signal burst periodically transmitted, wherein a first synchronization signal and a second synchronization signal are mapped at a particular time position in a radio frame, each of the at least one synchronization signal burst includes at least one synchronization signal block, each of the at least one synchronization signal block includes at least one of the first synchronization signal, the second synchronization signal, or a physical broadcast channel, and the transmitter transmits, from the base station apparatus, information for indicating the number of the at least one synchronization signal block included in each of the at least one synchronization signal burst.

A program running on an apparatus according to an aspect of the present invention may serve as a program that controls a Central Processing Unit (CPU) and the like to cause a computer to function in such a manner as to realize the functions of the embodiment according to the aspect of the present invention. Programs or the information handled by the programs are temporarily stored in a volatile memory such as a Random Access Memory (RAM), a non-volatile memory such as a flash memory, a Hard Disk Drive (HDD), or any other storage device system.

Note that a program for realizing the functions of the embodiment according to an aspect of the present invention may be recorded in a computer-readable recording medium. This configuration may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining the program for a short time, or any other computer readable recording medium.

Furthermore, each functional block or various characteristics of the apparatuses used in the above-described embodiment may be implemented or performed on an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor or may be a processor of known type, a controller, a micro-controller, or a state machine instead. The above-mentioned electric circuit may include a digital circuit, or may include an analog circuit. Furthermore, in a case that with advances in semiconductor technology, a circuit integration technology appears that replaces the present integrated circuits, it is also possible to use a new integrated circuit based on the technology according to one or more aspects of the present invention.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications can be made to the aspect of the present invention within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be utilized, for example, in a communication system, communication equipment (for example, a cellular phone apparatus, a base station apparatus, a radio LAN apparatus, or a sensor device), an integrated circuit (for example, a communication chip), or a program.

REFERENCE SIGNS LIST 1 (1A, 1B, 1C) Terminal apparatus
3 Base station apparatus
10 TXRU
11 Phase shifter
12 Antenna unit
101 Higher layer processing unit
103 Controller
105 Receiver
107 Transmitter
109 Antenna unit
301 Higher layer processing unit
303 Controller
305 Receiver
307 Transmitter
1013 Scheduling information interpretation unit
1015 Channel State Information report controller
1051 Decoding unit
1053 Decoding unit
1055 Demultiplexing unit
1057 Radio receiver
1059 Measurement unit
1071 Coding unit
1073 Modulation unit
1075 Multiplexing unit
1077 Radio transmitter
1079 Uplink reference signal generation unit
3011 Radio resource controller
3013 Scheduling unit
3015 Channel State Information report controller
3051 Decoding unit
3053 Decoding unit
3055 Demultiplexing unit
3057 Radio receiver
3059 Measurement unit
3071 Coding unit
3073 Modulation unit
3075 Multiplexing unit
3077 Radio transmitter
3079 Downlink reference signal generation unit

The invention claimed is:

1. A terminal device which communicates with a base station, the terminal device comprising:
reception circuitry configured to receive one or more synchronization signal blocks transmitted by the base station; and
synchronization circuitry configured to perform time and frequency synchronization,
wherein each of the one or more synchronization blocks includes a first synchronization signal, a second synchronization signal, and a physical broadcast channel (PBCH),
each of the one or more synchronization signal blocks consists of consecutive orthogonal frequency division multiplexing (OFDM) symbols, and
the reception circuitry obtains a quantity of the one or more synchronization signal blocks transmitted by the base station.

2. The terminal device according to claim 1, wherein the one or more synchronization signal blocks is included in a synchronization signal burst.

3. A base station device which communicates with a terminal, the base station device comprising:
synchronization signal generation circuitry configured to generate a first synchronization signal, a second synchronization signal; and
transmission circuitry configured to transmit one or more synchronization signal blocks,
wherein each of the one or more synchronization blocks includes the first synchronization signal, the second synchronization signal, and a physical broadcast channel (PBCH),
each of the one or more synchronization signal blocks consists of consecutive orthogonal frequency division multiplexing (OFDM) symbols, and information indicative of a quantity of the one or more synchronization signal blocks is provided to the terminal by the base station device.

4. The base station device according to claim 3, wherein the one or more synchronization signal blocks is included in a synchronization signal burst.

5. A communication method of a terminal device which communicates with a base station, the communication method comprising:
- receiving one or more synchronization signal blocks transmitted by the base station;
- obtaining a quantity of the one or more synchronization signal blocks transmitted by the base station; and
- performing time and frequency synchronization,
- wherein each of the one or more synchronization blocks includes a first synchronization signal, a second synchronization signal, and a physical broadcast channel (PBCH),
- each of the one or more synchronization signal blocks consists of consecutive orthogonal frequency division multiplexing (OFDM) symbols.

6. A communication method of a base station device which communicates with a terminal, the communication method comprising:
- generating a first synchronization signal, a second synchronization signal; and
- transmitting one or more synchronization signal blocks; and
- wherein each of the one or more synchronization blocks includes the first synchronization signal, the second synchronization signal, and a physical broadcast channel (PBCH),
- each of the one or more synchronization signal blocks consists of consecutive orthogonal frequency division multiplexing (OFDM) symbols, and
- information indicative of a quantity of the one or more synchronization signal blocks is provided to a terminal by the base station device.

* * * * *